(12) United States Patent
Zurek et al.

(10) Patent No.: US 7,529,379 B2
(45) Date of Patent: May 5, 2009

(54) SYSTEM AND METHOD FOR DETERMINING AN IN-EAR ACOUSTIC RESPONSE FOR CONFIRMING THE IDENTITY OF A USER

(75) Inventors: Robert A. Zurek, Antioch, IL (US);
Michael L. Charlier, Palatine, IL (US);
John Johnson, Spring Grove, IL (US);
Simone Koo, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 683 days.

(21) Appl. No.: 11/028,873

(22) Filed: Jan. 4, 2005

(65) Prior Publication Data
US 2009/0087003 A1    Apr. 2, 2009

(51) Int. Cl.
*H04R 25/00* (2006.01)
*A61B 5/12* (2006.01)
*A61B 5/00* (2006.01)

(52) U.S. Cl. .................. 381/328; 381/320; 600/559; 73/585

(58) Field of Classification Search .......... 381/60, 381/320, 328, 380; 73/585; 600/559
See application file for complete search history.

(56) References Cited

U.S. PATENT DOCUMENTS

| | | | |
|---|---|---|---|
| 3,227,836 A * | 1/1966 | Renwick, Sr. ......... 200/61.58 R |
| 4,644,581 A | 2/1987 | Sapiejewski | |
| 4,955,729 A * | 9/1990 | Marx ..................... 381/322 |
| 4,977,601 A * | 12/1990 | Bicz ..................... 382/124 |
| 5,105,822 A * | 4/1992 | Stevens et al. ........... 600/559 |
| 5,164,984 A | 11/1992 | Suhami et al. | |
| 5,664,014 A | 9/1997 | Yamaguchi et al. | |
| 5,692,059 A | 11/1997 | Kruger | |
| 5,787,187 A | 7/1998 | Bouchard et al. | |
| 5,792,073 A | 8/1998 | Keefe | |
| 5,812,659 A | 9/1998 | Mauney et al. | |
| 5,844,984 A | 12/1998 | Yamaguchi et al. | |
| 6,181,801 B1 | 1/2001 | Puthuff et al. | |
| 6,415,034 B1 | 7/2002 | Hietanen | |
| 6,445,799 B1 | 9/2002 | Taenzer et al. | |
| 6,567,524 B1 | 5/2003 | Svean et al. | |
| 2002/0057805 A1* | 5/2002 | Kato et al. ............... 381/56 |

FOREIGN PATENT DOCUMENTS

| EP | 0 825 798 A2 | 7/1997 |
|---|---|---|
| EP | 1205884 A2 | 5/2002 |
| WO | WO 02/07477 A2 | 1/2002 |
| WO | 02091310 A1 | 11/2002 |

* cited by examiner

*Primary Examiner*—Curtis Kuntz
*Assistant Examiner*—Jesse A Elbin
(74) *Attorney, Agent, or Firm*—Lawrence J. Chapa

(57) ABSTRACT

A system and method is provided for confirming the identity of a user, where the confirmation is made using biometric data. The system includes an internal speaker having an audio port, which is positioned within the ear of the user, and is adapted for producing a signal having one or more frequencies. The system further includes an internal microphone having an audio port, which is positioned within the ear of the user, and is adapted for detecting a resulting signal including the signal produced by the internal speaker and any corresponding signal reflections. A determination is then made as to whether the resulting signal detected by the internal microphone matches the corresponding predetermined expected signal, based upon a prestored hearing profile.

21 Claims, 3 Drawing Sheets

SYSTEM AND METHOD FOR DETERMINING AN IN-EAR ACOUSTIC RESPONSE FOR CONFIRMING THE IDENTITY OF A USER

FIELD OF THE INVENTION

The present invention relates generally to the confirmation of the identity of a user using biometric information. More particularly, the present invention relates to confirming the identity of the user using an in-ear acoustic response.

BACKGROUND OF THE INVENTION

Many systems have been concerned with confirming the identity of a user, and several of these have incorporated one or more of various biometric signatures, which are believed to be unique for each individual. Examples of biometric information, which has historically been used to confirm the identity of a user, include scans of finger prints, retinal scans, and voice prints.

Once a user's identity has been determined, the determination can be used to enable/disable access to a device or functions for use with a device. Furthermore, a user's identity can be used to load a set of user preferences, when the particular user is operating the device. Still further a secure manner of establishing one's identity can be used to authenticate the source information communicated by the user of a device.

Security mechanisms, generally need to have safeguards in place, which will limit their circumvention. However, it is generally understood that no security mechanism is fool proof. If one is given enough time and sufficient resources, most security mechanisms can be overcome. Correspondingly, a security minded individual will often try to make the task of overcoming the security mechanisms as difficult as possible.

At least one manner, which has been used to enhance various security mechanisms involves implementing locks which do not have a static key, i.e. a fixed solution such a password. In some instances an algorithm can be used in connection with a pseudo random set of inputs, where the response as determined by the algorithm is dependent upon the pseudo random set of inputs, which are extremely unlikely to be anticipated, as well as can similarly be set up so as to be unlikely to ever repeat. Consequently any previously intercepted valid responses would likely be invalid and/or of limited assistance relative to a determination of future responses. As a result, one would need to be able to decode the algorithm and intercept the future pseudo-random inputs before a valid future response could be generated. Still further where the algorithm incorporates the variability associated with a user's biometric information, one would presumably need access to the individual as part of the decomposition of the algorithm. Biometric data generally is rather complex and so for many types of biometric data does not readily decode based upon casual observance, and therefore any attempt to decode would be relatively fairly intrusive, and consequently the ability to use biometric information as part of an algorithm for use as a security mechanism, would make one's attempts to decode the algorithm fairly obvious.

SUMMARY OF THE INVENTION

The present invention provides for a system for confirming the identity of a user. The system includes an internal speaker, which is positioned within the ear of the user, and is adapted for producing a signal having one or more frequencies. The system further includes an internal microphone, which is positioned within the ear of the user, and is adapted for detecting a resulting signal including the signal produced by the internal speaker and any corresponding signal reflections. The system still further includes a storage unit, which includes a prestored hearing profile, which is adapted for predicting an expected signal, resulting from a produced signal having one or more frequencies, and a signal processing unit, coupled to the internal speaker, the internal microphone, and the storage unit. The signal processing unit includes a selection unit for selecting one or more frequencies to be produced, a comparison unit for comparing the resulting signal with a predetermined expected signal, and a determination unit for determining if the resulting signal detected by the internal microphone matches the corresponding predetermined expected signal.

In at least one embodiment, the signal produced by the internal speaker has multiple frequencies, wherein the detected resulting signal includes one or more distortion product otoacoustic emission tones generated by an inner portion of the ear having a nonlinear response.

In at least a further embodiment, the signal processing unit further includes an authorization unit adapted for providing access to one or more sets of user functions, if a match is identified by the determination unit The present invention further provides a method for confirming the identity of a user using an audio receiving system including an internal microphone and an internal speaker proximate an ear of a user. The method includes selecting one or more frequencies. A signal is then produced by the internal speaker having the one or more frequencies. A resulting signal including the signal produced by the internal speaker and any corresponding signal reflections is then received. The received resulting signal is then compared with a predetermined expected signal, where a determination is made as to whether a substantial match exists between the received resulting signal and the predetermined expected signal.

These and other features, and advantages of this invention are evident from the following description of one or more preferred embodiments of this invention, with reference to the accompanying drawings.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein, however, it is to be understood that the disclosed embodiments are merely exemplary of the invention, which can be embodied in various forms. Therefore, specific structural and functional details disclosed herein are not to be interpreted as limiting, but merely serve as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

Figure 1:
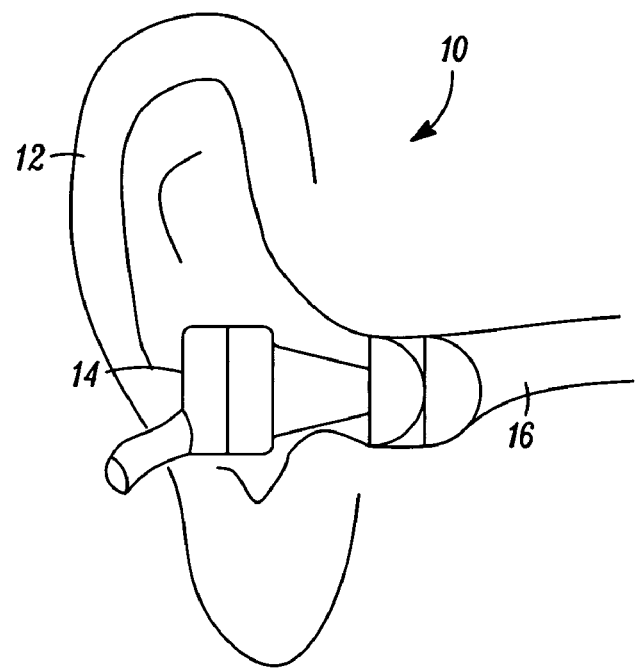
FIG. 1 is a cut away view of a user's ear illustrating an ear piece, in accordance with at least one embodiment of the present invention, inserted at least partially within the ear canal of the user.

FIG. 1 illustrates a cut away view 10 of a user's ear 12 illustrating an ear piece 14, in accordance with at least one embodiment of the present invention, inserted at least partially within the ear canal 16 of the user.

Figure 2:
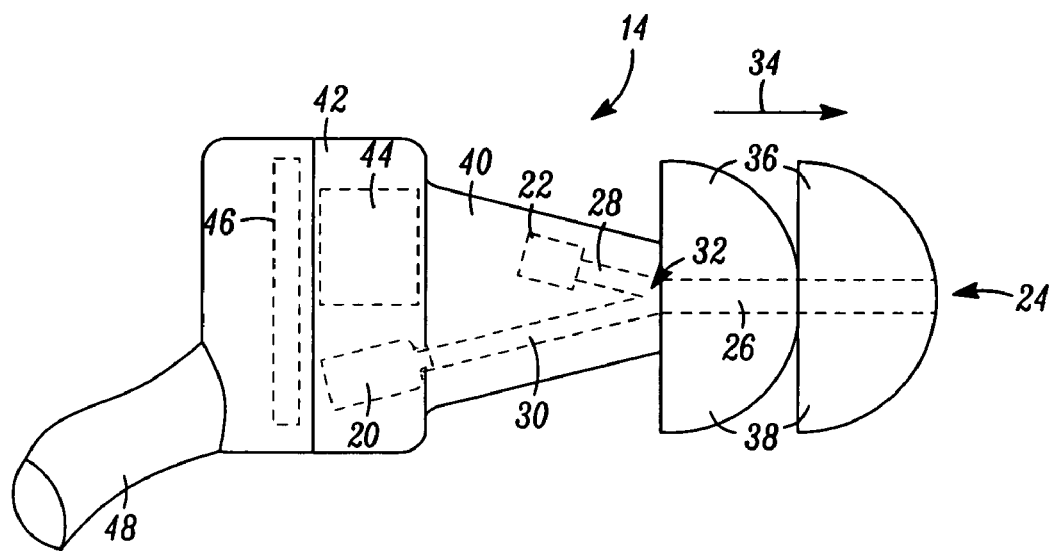
FIG. 2 is a side plan view of the ear piece, illustrated in FIG. 1, which highlights the positional placement of some of the internal elements, in accordance with at least one embodiment of the present invention.

FIG. 2 illustrates an enlarged side plan view of the ear piece 14, shown in FIG. 1, which highlights the positional placement of some of the internal elements, in accordance with at least one embodiment of the present invention. The ear piece 14 includes an internal speaker 20 and an internal microphone 22, which are both coupled to an audio port 24, corresponding to an opening in the external housing, via a trunk 26 having first branch 28 and a second branch 30. The first branch 28 and the second branch 30 join at the trunk 26 via an acoustic coupling 32. The first branch 28 couples the internal microphone 22 to the audio port 24, and the second branch 30 couples the internal speaker 20 to the audio port 24.

The separate branches 28, 30 provide a fixed degree of acoustic coupling between the internal speaker 20 and the internal microphone 22. Furthermore, to the extent that the two elements continue to potentially interfere with one another, the known geometry and the static nature of the acoustic coupling 32 enables one to determine and/or reasonably predict the amount of interference, and to take steps to filter and/or remove the interference.

In at least one embodiment, the internal microphone 22 is an omni-directional electret microphone, and the internal speaker 20 is a balanced armature loudspeaker The output audio port 24 is arranged relative to the external housing, so as to exit the ear piece 14 into a user's ear canal 16, when the ear piece 14 is at least partially inserted. Proximate the output audio 24, the external housing is constructed and arranged as a pair of cascading (i.e. laterally offset in the direction of insertion 34) semi-spheres 36 made of a pliable material having their convex curved surface 38 which faces toward the ear canal 16 upon insertion. When placed within the ear canal 16 of the user, the semi-spheres 36 made of pliable material will flex so as to conform to the shape of the ear canal 16, thereby producing a seal, which limits the amount of sound that will traverse across the external surface of the semi-spheres 36. The sealing, generally does not affect the transmission of sound via the internal audio porting formed from the previously identified trunk 26 and the first and second branches 28, 30, which travel through the semi-spheres 36 proximate their center.

The ear piece 14 has a neck 40 located between the semi-spheres 36 and a cylindrical body 42, wherein the width of the neck 40 widens closer to the cylindrical body 42. Conversely, the neck 40 tapers toward the point of initial insertion, where the diameter of the neck 40, where the neck 40 meets the semi-spheres 36 is narrower than the diameters of the semi-spheres 36. The narrower diameter of the neck 40 proximate the semi-spheres 36 provides the outer surface of the semi-spheres 36 room to flex in connection with making a seal.

The body 42 of the ear piece 14 includes a battery 44, which can be re-charged through a port in the body 42 (not shown), as well as includes a substrate 46 upon which electronic circuit elements can be positioned or placed, such as a transceiver 50 (FIG. 3) for short range communication, e.g. a Bluetooth transceiver. A nub at the end of the body 42 houses an antenna 48 for use in transmitting and receiving signals via the transceiver 50.

The transceiver 50 provides at least one method for transmitting signals detected by the internal microphone 22 and receiving signals to be reproduced by the internal speaker 20. Still further, the conveyance of other signals would similarly be possible. One skilled in the art will readily appreciate, that signals could be alternatively and/or additionally communicated to and from the ear piece 14, via a hard wired connection.

Figure 3:
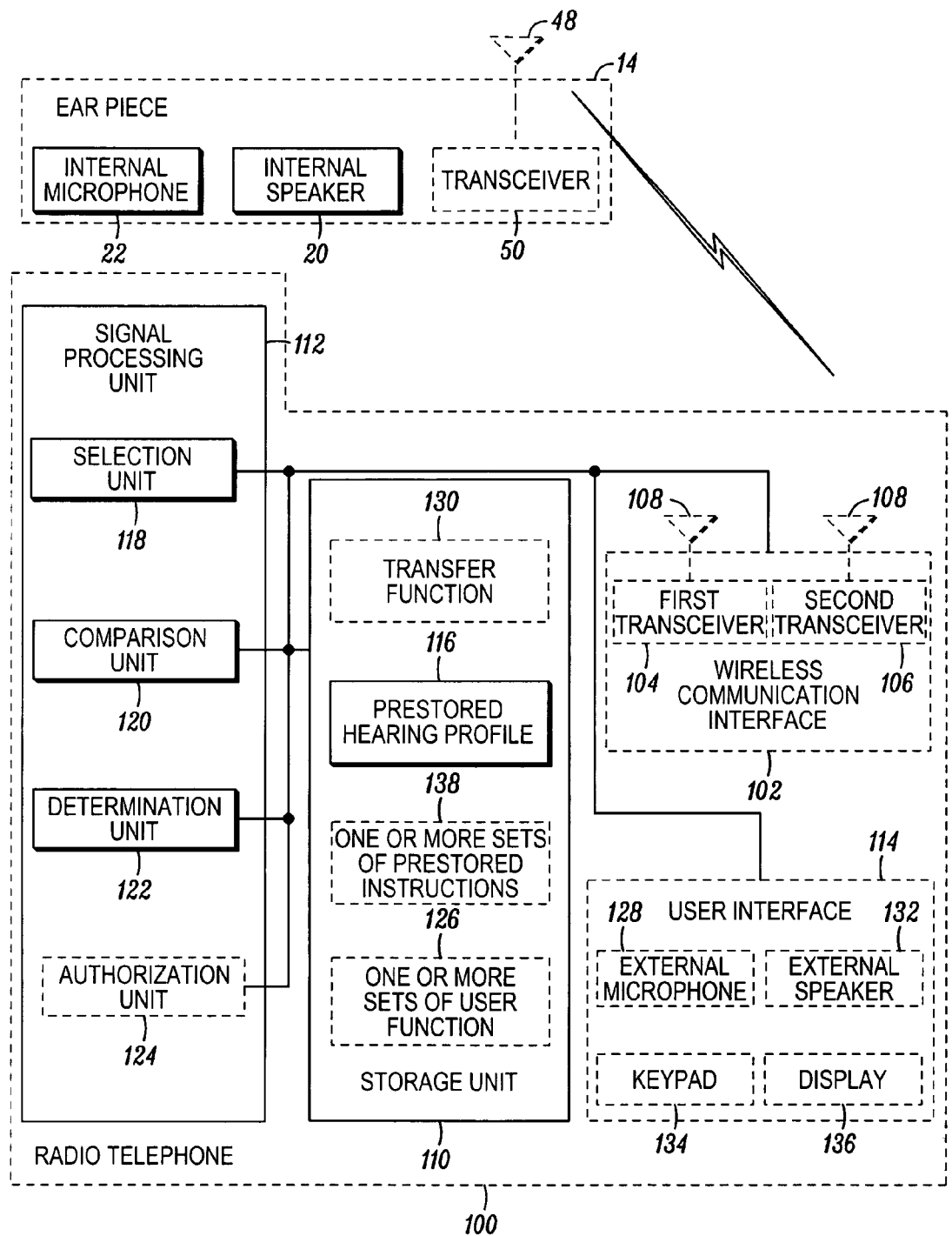
FIG. 3 is a block diagram of a system for confirming the identity of a user incorporating an ear piece and a radio telephone, in accordance with at least one embodiment of the present invention.

FIG. 3 illustrates a block diagram of a system for confirming the identity of a user incorporating a radio telephone 100 and an ear piece 14, which in at least one embodiment is consistent with the ear piece 14 illustrated in FIGS. 1 and 2.

In the illustrated embodiment, the radio telephone 100 includes a wireless communication interface 102, via which the radio telephone 100 is communicatively coupled to the ear piece 14. In the illustrated embodiment, the radio telephone includes a first transceiver 104 and a second transceiver 106, each of which is coupled to a corresponding antenna 108. In at least one embodiment, the first transceiver 104 is adapted for communicating within a cellular network, and the second transceiver 106 is adapted for short range communication, of the type incorporated as part of the ear piece 14 (e.g. Bluetooth). However one skilled in the art will recognize that the present invention is not dependent upon the exact nature of the communication capabilities, relative to the type of technology and/or the protocol employed, but are generally intended to enable signals to be communicated between the various elements.

The radio telephone 100 additionally includes a storage unit 110, a signal processing unit 112, and in accordance with at least some embodiments, a user interface 114. The storage unit 110 includes a prestored hearing profile 116 which can be used for confirming the identity of a user. In at least one instance the hearing profile includes previously measured responses including the non-linear response of the reflected signals detected by the internal microphone 22, in response to producing one or more predetermined frequencies by the internal speaker 20. The hearing profile 116 can include both frequency and amplitude information relative to the reflected signals, in response to the known stimulus pattern corresponding to the produced signal.

The signal processing unit 112 includes a selection unit 118, which is adapted for selecting one or more frequencies to be produced. The signal processing unit 112 additionally includes a comparison unit 120, which is adapted for comparing the resulting signal detected by the internal microphone 22 and comparing the resulting signal with a predetermined expected signal. The signal processing unit 112 still further includes a determination unit 122, which is adapted for determining if the resulting signal detected by the internal microphone 22 matches the corresponding predetermined expected signal.

For example, when a pair of frequencies are produced within the ear, a distortion product otoacoustic emission tone is produced, which has a frequency that is equivalent to two times the lower one of the two supplied frequencies minus the higher one of the two supplied frequencies. One would additionally expect the resulting signal would additionally include a signal component having a frequency, which matches each of the two supplied signal, as well as the additional distortion product otoacoustic emission tone. By comparing the signal characteristics of the response signal including the amplitude of each of the signal components, at least a potential partial match of the user can be determined. The original supplied frequencies could be determined using a pseudo-random number seed generator.

In at least some embodiments, the signal processing unit 112 will additionally include an authorization unit 124, which is adapted for providing access to one or more sets of user functions 126, if a match is identified. The one or more sets of user functions 126 could be stored within the storage unit 110.

In addition to the use of a prestored hearing profile for purposes of confirming the identity of the user, the system could additionally compare the user's voice received by the internal microphone 22, positioned within the user's ear, with an external microphone 128, positioned external to the user ear. In at least one embodiment, the system uses the microphone incorporated as part of the radio telephone as the external microphone 128. Alternatively, the external microphone could be incorporated within the ear piece 14 having an audio port having an opening to the external world, which is external to the sealed portion of the ear 12. Still further, the external microphone can be positioned at the end of a boom, which could extend away from the ear piece 14 and toward the user's mouth. One skilled in the art will recognize that still further arrangements are possible without departing from the teachings of the present invention.

The corresponding signal received via the internal microphone 22 could be compared relative to the signal received via the external microphone 128, and the corresponding difference could be compared relative to a prestored transfer function 130, in order to make further determinations concerning the identity of the user.

Still further identifying characteristics could be measured and compared against previously determined base line measurements. As a further example one or more sensors could be placed along the external surface of the ear piece 14 housing at a location, which is proximate relative to the position where the ear piece 14 will produce a seal relative to the ear 12. The sensors could additionally be used to test the integrity of any seal. The sensors could be one or more of a pressure or proximity sensor.

In addition to the external microphone 128, which forms part of the user interface 114 of the radio telephone 100, in accordance with the illustrated embodiment, the user interface 114 additionally can include an external speaker 132, a keypad 134, and/or a display 136, as well as other elements which facilitate user interaction with the radio telephone 100.

In at least some embodiments, at least a portion of the signal processing unit 112 including the corresponding selection unit 118, comparison unit 120, determination unit 122, and authorization unit 124 can take the form of one or more sets 138 of prestored instructions, which are executed by one or more microprocessors. The one or more sets 138 of prestored instructions can be maintained in the storage unit 110, which in some instances can be separate from or integrated as part of any microprocessor, which might form all or part of the signal processing unit 112. Still further, one or more sets 138 of prestored instructions can include programming or software instructions and/or microcode. In the same and/or other embodiments, all or parts of the various elements including the selection unit 118, comparison unit 120, determination unit 122, and authorization unit 124 can be alternatively and/or or partially implemented in hardware using discrete or integrated circuit elements, including logic gates and/or sequential state machines. However, one skilled in the art will readily appreciate that still further approaches are possible for implementing the same without departing from the teachings of the present invention.

The storage element 110 can include both volatile and non-volatile forms of memory, many types of which are well known to one skilled in the art. One such example includes a semiconductor memory, for example a read only memory. Other examples include a fixed drive or hard drive, which commonly stores information magnetically. However any form of data storage may be suitable, as long as it supports the ability to at least initially store, and later retrieve the information contained therein.

Furthermore, while the signal processing unit 112 and the storage unit 110 were described in connection with a corresponding radio telephone 100, which is communicatively coupled to the ear piece 14, one skilled in the art will readily appreciate that the signal processing unit 112 and the storage unit 110 could alternatively be incorporated as part of a type of device, which is other than a radio telephone 100. The signal processing unit 112 and the storage unit 110 could similarly be incorporated as part of the ear piece 14, itself.

Figure 4:
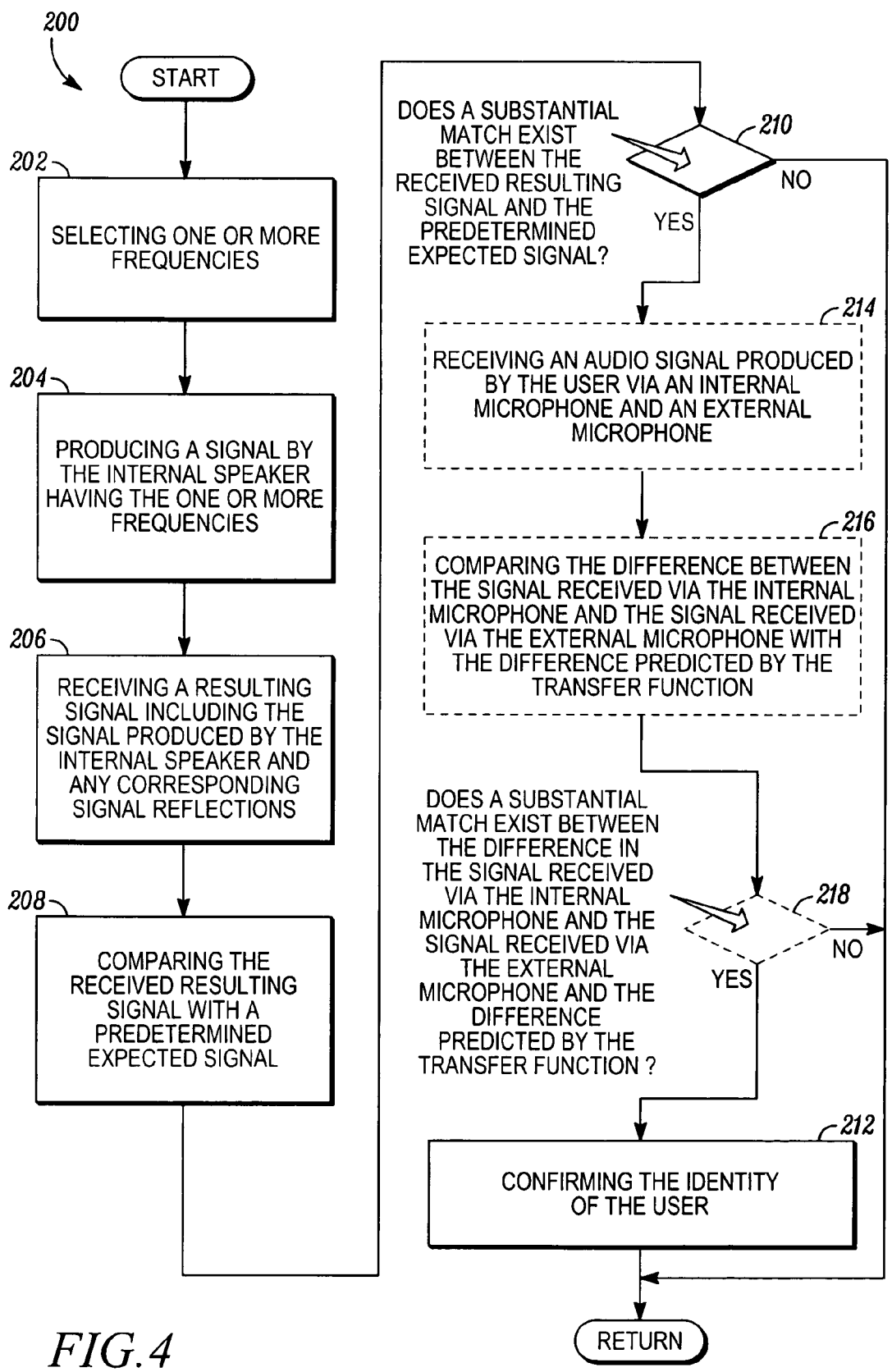
FIG. 4 is a flow diagram of a method for confirming the identity of a user using an audio receiving system including an internal microphone and an internal speaker proximate an ear of a user, in accordance with at least one embodiment of the present invention.

FIG. 4 illustrates a flow diagram of a method 200 for confirming the identity of a user using an audio receiving system including an internal microphone and an internal speaker proximate an ear of a user, in accordance with at least one embodiment of the present invention. The method 200 includes selecting 202 one or more frequencies, and producing 204 a signal by the internal speaker having the one or more frequencies. A resulting signal is then received 206, which includes the signal produced by the internal speaker and any corresponding signal reflections. The received resulting signal is then compared 208 with a predetermined expected signal, and a determination 210 is made whether a substantial match exists between the received resulting signal and the predetermined expected signal.

In at least some embodiments of the present invention, a confirmation of the identity will be made based upon the results of the comparison between the received resulting signal and the predetermined expected signal.

However in at least further embodiments, the results of the comparison between the received resulting signal and the predetermined expected signal will be supplemented with additional criteria from which a match can be determined, such as a comparison of the measured difference between a received signal, corresponding to the user's voice, received by each of the internal microphone and the external microphone, with a predetermined expected result, which could be derived from a prestored transfer function. In these instances the method 200 will further include receiving 214 an audio signal produced by the user via an internal microphone and an external microphone, and then comparing 216 the difference between the signal received via the internal microphone and the signal received via the external microphone with the difference predicted by a predetermined transfer function. A determination 218 is then made relative to whether a difference in the signal received via the internal microphone and the signal received via the external microphone, matches the difference predicted by the predetermined transfer function.

In this instance, if a substantial match is determined to exist between the received resulting signal and the predetermined expected signal, and a substantial match is determined to exist between the difference in the signal received via the internal microphone and the signal received via the external microphone and the difference predicted by the predetermined transfer function, then the identity of the user is confirmed 212.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A system for confirming the identity of a user comprising:
    an internal speaker, positioned within the ear of the user, adapted for producing a signal having one or more frequencies;
    an internal microphone, positioned within the ear of the user, adapted for detecting a resulting signal including the signal produced by the internal speaker and any corresponding signal reflections;
    a storage unit, which includes a prestored hearing profile, which is adapted for predicting an expected signal, resulting from a produced signal having one or more frequencies; and
    a signal processing unit, coupled to the internal speaker, the internal microphone, and the storage unit, the signal processing unit including:
        a selection unit for selecting one or more frequencies to be produced, wherein the frequencies produced by the internal speaker include a dynamically selected set of frequencies determined proximate the time of measurement;
        a comparison unit for comparing the resulting signal with a predetermined expected signal; and
        a determination unit for determining if the resulting signal detected by the internal microphone matches the corresponding predetermined expected signal.

2. A system in accordance with claim 1 wherein the signal produced by the internal speaker has multiple frequencies, wherein the detected resulting signal includes one or more distortion product otoacoustic emission tones generated by an inner portion of the ear having a nonlinear response.

3. A system in accordance with claim 1 wherein the internal microphone and internal speaker are incorporated as part of an earpiece.

4. A system in accordance with claim 3 wherein the earpiece includes an earbud, which fits at least partially within an ear canal of the user.

5. A system in accordance with claim 4 wherein the earbud includes a housing having an external surface, which provides a seal against the inner wall of the ear canal, when at least a portion of the earbud is firmly placed within the ear canal of the user.

6. A system in accordance with claim 5 wherein the external surface includes one or more pressure sensors for detecting the integrity of the seal against the inner wall of the ear canal.

7. A system in accordance with claim 5 wherein the earbud includes an audio port coupled to the internal microphone having an opening at the external surface of the housing along the portion of the external surface which is located within the ear canal of the user.

8. A system in accordance with claim 7 wherein the audio port includes a first branch and a second branch coupled to the same external surface opening, where the first branch of the audio port is coupled to the internal microphone and the second branch of the audio port is coupled to the internal speaker.

9. A system in accordance with claim 1 wherein the signal processing unit further includes an authorization unit adapted for providing access to one or more sets of user functions, if a match is identified by the determination unit.

10. A system in accordance with claim 1 further comprising an external microphone, coupled to the signal processing unit, adapted for receiving an audio signal, wherein said internal microphone is further adapted for receiving said audio signal, and wherein said storage unit additionally includes a transfer function, which represents the predetermined difference between a signal detected by each of the internal microphone and the external microphone, that is produced by the user, wherein the comparison unit is further adapted for comparing the difference of an audio signal that is produced by the user and detected by each of the internal microphone and the external microphone with the difference predicted by the transfer function, and the determination unit is further adapted for determining if the detected difference of the audio signal matches the difference predicted by the transfer function.

11. A system in accordance with claim 10 wherein the external microphone and the signal processing unit are incorporated as part of radio telephone.

12. A system in accordance with claim 1 wherein the one or more frequencies selected to be produced are selected based upon a substantially random seed value.

13. A system for confirming the identity of a user comprising:
    an internal speaker, positioned within the ear of the user, adapted for producing a signal having one or more frequencies;
    an internal microphone, positioned within the ear of the user, adapted for detecting a resulting signal including the signal produced by the internal speaker and any corresponding signal reflections;
    a storage unit, which includes a prestored hearing profile, which is adapted for predicting an expected signal, resulting from a produced signal having one or more frequencies; and
    a signal processing unit, coupled to the internal speaker, the internal microphone, and the storage unit, the signal processing unit including:
        a selection unit for selecting one or more frequencies to be produced;
        a comparison unit for comparing the resulting signal with a predetermined expected signal; and
    a determination unit for determining if the resulting signal detected by the internal microphone matches the corresponding predetermined expected signal; and
    wherein the internal microphone and internal speaker are incorporated as part of an earpiece;
    wherein the earpiece includes an earbud, which fits at least partially within an ear canal of the user;
    wherein the earbud includes a housing having an external surface which provides a seal against the inner wall of the ear canal, when at least a portion of the earbud is firmly placed within the ear canal of the user;
    wherein the external surface includes one or more pressure sensors for detecting the integrity of the seal against the inner wall of the ear canal; and
    wherein the pressure sensors are adapted to detect the geometry of the ear of the user.

14. A method for confirming the identity of a user using an audio receiving system including an internal microphone and an internal speaker proximate an ear of a user, said method comprising:
- selecting one or more frequencies;
- producing a signal by the internal speaker having the one or more frequencies;
- receiving a resulting signal including the signal produced by the internal speaker and any corresponding signal reflections;
- comparing the received resulting signal with a predetermined expected signal; and
- determining if a substantial match exists between the received resulting signal and the predetermined expected signal; and
- wherein the frequencies produced by the internal speaker include a dynamically selected set of frequencies determined proximate the time of measurement.

15. A method in accordance with claim 14 wherein, if a substantial match is determined to exist between the received resulting signal and the predetermined expected signal, then the identity of the user is confirmed.

16. A method in accordance with claim 15 wherein when the identity of the user is confirmed, access is provided to one or more sets of functions specific to the identified user.

17. A method in accordance with claim 14 wherein the predetermined expected signal is determined by sampling a resulting signal in response to producing a signal having each one of the frequencies from which the one or more frequencies are anticipated to be selected.

18. A method in accordance with claim 14 further comprising:
- receiving an audio signal produced by the user via an internal microphone and an external microphone,
- comparing the difference between the signal received via the internal microphone and the signal received via the external microphone with the difference predicted by a predetermined transfer function, and
- determining if a substantial match exists between the difference in the signal received via the internal microphone and the signal received via the external microphone and the difference predicted by the predetermined transfer function.

19. A method in accordance with claim 18 wherein, if a substantial match is determined to exist between the received resulting signal and the predetermined expected signal, and a substantial match is determined to exist between the difference in the signal received via the internal microphone and the signal received via the external microphone and the difference predicted by the predetermined transfer function then the identity of the user is confirmed.

20. A method in accordance with claim 18 wherein the transfer function is determined by sampling previous examples of speech from the user by each of the internal microphone and the external microphone and computing the difference between the sampled examples of the same portions of speech.

21. A method in accordance with claim 20 wherein the transfer function is non-linear relative to frequency.

\* \* \* \* \*